No. 770,451. PATENTED SEPT. 20, 1904.
V. L. CAPWELL.
FOUNTAIN PEN.
APPLICATION FILED JAN. 21, 1904.
NO MODEL.
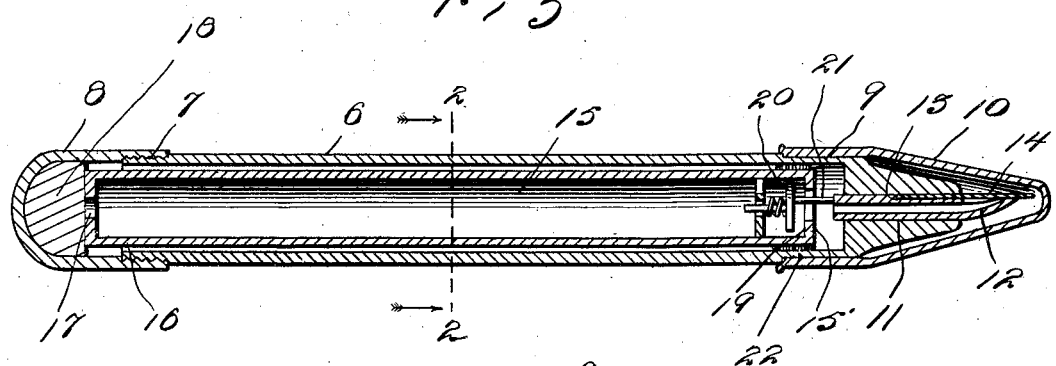
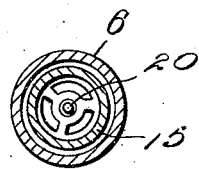
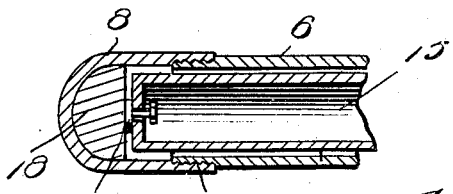
Witnesses
Inventor
V. L. Capwell
By Chandler & Chandler
Attorneys No. 770,451. Patented September 20, 1904.

UNITED STATES PATENT OFFICE.

VERNON L. CAPWELL, OF DORRANCETON, PENNSYLVANIA.

FOUNTAIN-PEN.

SPECIFICATION forming part of Letters Patent No. 770,451, dated September 20, 1904.

Application filed January 21, 1904. Serial No. 190,026. (No model.)

*To all whom it may concern:*

Be it known that I, VERNON L. CAPWELL, a citizen of the United States, residing at Dorranceton, in the county of Luzerne, State of Pennsylvania, have invented certain new and useful Improvements in Fountain-Pens; and I do hereby declare the following to be a full, clear, and exact description of the invention, such as will enable others skilled in the art to which it appertains to make and use the same.

This invention relates to pens, and more particularly to the class known as "fountain-pens," and has for its object to provide a device of this nature which will occupy no more room than similar articles in use at present, but which will combine in a single article both the pen itself and a pump for filling the reservoir thereof.

In the drawings forming a portion of this specification, and in which like numerals of reference indicate similar parts in the several views, Figure 1 is a longitudinal section of the complete pen. Fig. 2 is a section on line 2 2 of Fig. 1. Fig. 3 is a modification showing the use of a valve in the outer end of the casing.

Referring now to the drawings, the present invention comprises a cylindrical casing 6, which forms the reservoir of the pen and which is open at one end and threaded, as shown at 7, to receive a screw-cap 8. The opposite end 9 of the casing is reduced to receive a cap 10 to protect the pen-point and has a passage 11 therethrough which receives the usual feeder 12. A suitable slot 13 is also provided for the reception of a pen-point 14.

Within the casing 6 there is disposed a tube 15, which extends beyond the open end of the casing 6 and into the cap 8. At this end of the tube 15, which may be designated by the numeral 16, there is a central perforation 17, and to close this perforation when the several parts are assembled the cap 8 is provided with a plug 18, of rubber, which bears against the end 16 of the inner tube. The opposite end of the tube 15, as shown at 15', is opened and has an inwardly-directed flange 19 thereon, against the inner face of which is disposed a valve-plate 20, which is adapted to lie at times closely thereagainst. Projecting from the inner end of the feeder 12 there is a pin 21, which when the tube 15 lies within the casing 6 projects through the opening 15' and unseats the valve-plate 20. The tube 15 fits closely within the casing 6; but it may be also provided with a wrapping of cord or other suitable material 22 for a purpose which will be presently explained.

In use when it is desired to fill the reservoir the cap 8 is removed from the casing 6 and the reduced end of the casing is placed in an ink-well or other receptacle containing writing fluid and the end 16 of the tube 15, which projects beyond the open end of the casing, is now grasped between the fingers and the tube is drawn upward. By reason of the fact that the tube 15 fits tightly within the casing 6 sufficient suction is caused within the casing to draw the writing fluid through the passage 11 around the feeder 12 into the reservoir. When the tube 15 has been nearly withdrawn from the casing, it is returned slowly to its original position. The pressure of the ink within the casing will unseat the valve-plate 20 and ink will rise within the tube 15, and when the tube has reached the inward limit of its motion the pin 21 will hold the valve-plate 20 unseated and will thus allow the ink to pass along the feeder 12 to the point 14. The cap 8 is of course replaced to close the open end of the casing 6, when the rubber plug 18 will close the perforation 17, as described above. In Fig. 3 there is shown a construction in which a valve 24 is provided for the perforation 17.

In practice modifications of the specific construction shown may be made, and any suitable materials and proportions may be used without departing from the spirit of the invention.

What is claimed is—

1. A fountain-pen comprising a handle having a reservoir therewithin for the reception of ink, a pen-point projecting from one end of the handle, ink-conducting mechanism communicating with the pen-point and with the reservoir, a plunger slidably disposed within the reservoir and having a passage therethrough, means for closing said passage at one end, and an additional means for closing the passage at the other end and for closing the reservoir.

2. In a fountain-pen the combination with a handle having a reservoir therewithin for the reception of ink, said reservoir being open at one of its ends, a pen-point projecting from one end of the handle, ink-delivering mechanism communicating with the pen-point and with the reservoir and a closure for the opening of the reservoir, of a plunger slidably disposed within the reservoir and having a passage therethrough, means for closing said passage during the withdrawal of the plunger from the reservoir to cause a vacuum therewithin and means for holding the closing means in inoperative position when the plunger is at the inward limit of its motion.

3. A fountain-pen comprising a handle having a reservoir therewithin and having a pen-point projecting from one end thereof, ink-conducting mechanism communicating with the reservoir and with the pen-point, a closure for the open end of the reservoir, and a plunger slidably disposed within the reservoir and having a passage therethrough, said passage being adapted to be closed when the plunger is drawn from the reservoir to cause a vacuum therewithin and to be opened to permit the plunger to be returned to its original position and means within the closure for the reservoir to close the passage through the plunger when said closure is in operative position.

4. A fountain-pen comprising a handle having a reservoir therewithin to receive ink and having a pen-point projecting from one of its ends, said reservoir being opened at the opposite end of the handle, a feeder disposed within the first-named end of the handle and communicating with the reservoir and with the pen to conduct ink thereto, a plunger slidably disposed within the reservoir and having a passage therethrough, an inwardly-opening valve at the inner end of the passage to close the latter when the plunger is withdrawn from the reservoir to cause a vacuum therewithin, a point projecting from one end of the feeder and adapted to engage the valve and to unseat the latter when the plunger is at the inner limit of its motion, and a closure for the open end of the reservoir.

In testimony whereof I affix my signature in presence of two witnesses.

VERNON L. CAPWELL.

Witnesses:
R. I. LAMOREUX,
GEO. E. RANSOM.